April 18, 1944.  D. E. WOBBE  2,346,714
CONTAINER
Filed Dec. 19, 1940

INVENTOR.
Delbert E. Wobbe
BY Ivan D. Thornburgh
Chas. H. Orne
ATTORNEYS

Patented Apr. 18, 1944

2,346,714

UNITED STATES PATENT OFFICE 2,346,714

CONTAINER

Delbert E. Wobbe, River Forest, Ill., assignor to American Can Company, New York, N. Y., a corporation of New Jersey Application December 19, 1940, Serial No. 370,882

3 Claims. (Cl. 220—64)

The present invention relates to a sheet metal container or can having a side seam and has particular reference to a can made of black iron having its surfaces protected against corrosion and having certain of its surfaces treated to permit of the application of solder.

An object therefore of the invention is the provision of a sheet metal can wherein its exterior surfaces are protected by a coating of heat resistant and solder repellent material which preferably covers all surfaces except the marginal edges or side seam area of the can, such a heat resistant and solder repellent material limiting the width of the solder and cooperating with it to reduce a continuous covering over the base metal thus completely protecting at least the entire outer surface of the can.

Another object is the provision of such a sheet metal can wherein its interior surface including the side seam area is protected with a heat resistant and solder repellent material so that the heat of soldering the side seam and the solder worked into the side seam during the soldering operation will not affect such protective coating material.

Another object is the provision of a sheet metal can of this character wherein a lithographed label or the like may be carried on the can over the heat resistant and solder repellent coating, the latter providing an ideal base for the lithographing as well as a protection against the heat of the solder used on the can.

Numerous other objects and advantages of the invention will be apparent as it is better understood from the following description, which, taken in connection with the accompanying drawing, discloses a preferred embodiment thereof.

Referring to the drawing.

Figure 1:
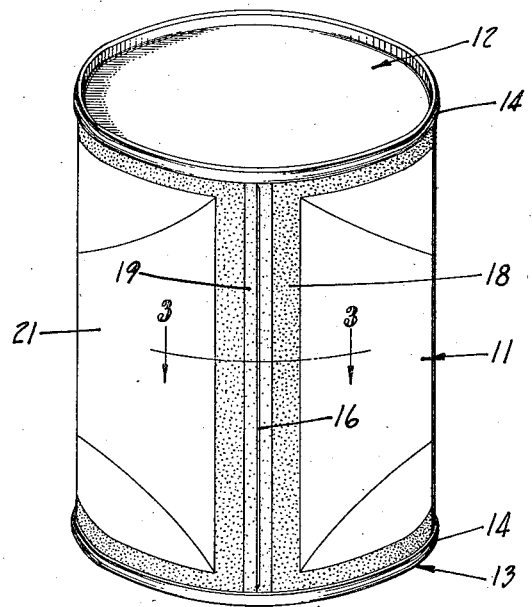
Figure 1 is a perspective view of a sheet metal can embodying the instant invention.
Figure 2:
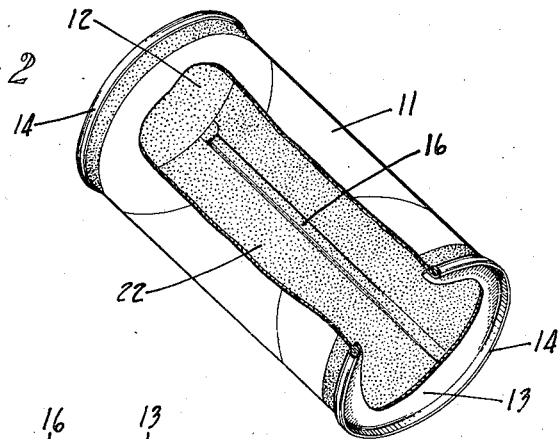
Fig. 2 is a view similar to Fig. 1 with parts of the can broken away to show the interior surfaces thereof.
Figure 3:
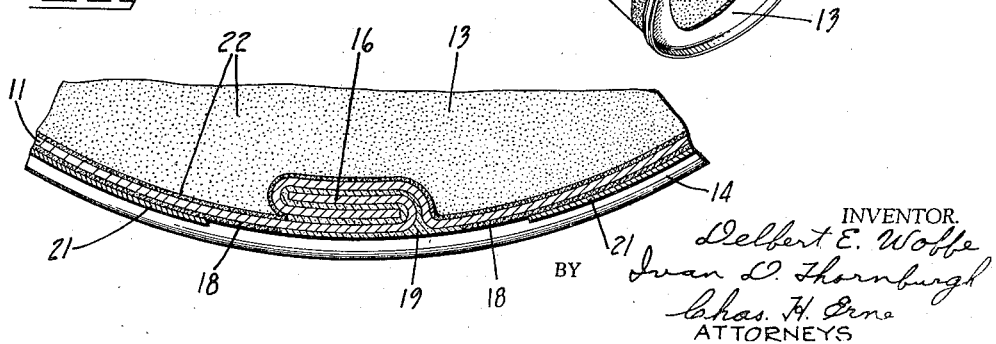
Fig. 3 is an enlarged fragmentary sectional view taken substantially along the line 3—3 of Fig. 1.

As a preferred embodiment of the invention the drawing discloses a cylindrical sheet metal can comprising a tubular body 11 having top and bottom end members 12, 13 secured thereto in suitable end seams 14 practiced in the can making art.

The body 11 is preferably made of black iron plate which is distinguished from tin plate, from which cans are usually made, by being devoid of any coating materials such as the tin. The marginal edges of the body which constitute the side seam area, are joined in the usual way to produce a side seam 16 which is preferably of the interfolded lock and lap seam character well known in can manufacture. In the contemplation of the present invention these marginal edges or deoxidized prior to their being incorporated in the side seam 16, the deoxidizing operation being effected in any suitable manner, as by abrasion, acid treatment or any other known method.

The entire exterior surface of the can body 11 is protected against corrosion as exposed black plate is highly susceptible to corrosion. To this end the outer surface of the body with the exception of the narrow deoxidized side seam area, is coated with a heat resistant and solder repellent material, such as a metallic paint 18, preferably aluminum. The side seam area of the body when the body is fully formed is coated with solder 19 which makes such a side seam hermetically sealed. This solder extends up to the edge of the aluminum coating, the latter limiting the width of the solder and cooperating with the solder coating to produce a continuous covering which completely protects the entire outer surface of the body.

The body 11 may also carry a lithographed label 21 or the like and this lithographing is applied directly over the aluminum coating. The aluminum coating is thus in effect an intermediate coating and is an ideal base for the lithographing as well as a protective coating for the can body.

The interior of the can is also protected against corrosion by oxidation while in storage and against attack from its contents after being filled. This protection is brought about by a coating 22 of heat resistant and solder repellent material such as that used on the outside of the can body. The entire inside surface of the body including the interfolded side seam portion is covered with this coating. Hence the heat of soldering and the solder which is worked into the folds of the side seam when the solder is applied to the outside thereof in no way affects this interior protective coating.

The top and bottom end members 12, 13 of the can may or may not be protected with a coating of this same heat resistant and solder repellent material. In some cases it may be desirable to make the can ends of tin plate or other similar material in which case a protective coating may not be desired. In other cases, however, these ends may be made of black plate and it is then desirable to protect the surfaces with aluminum paint or the like.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A sheet metal container having a soldered side seam, comprising a tubular body having a portion of its exterior surface on opposite sides of the side seam and substantially equally spaced therefrom, coated with a heat resistant and solder repellent metallic paint, said coated area defining on opposite sides of the seam straight edges running parallel with said seam and defining therebetween an area free of said coating to constitute an effective solderable side seam area of restricted minimum width, said uncoated area of the body being completely covered with a narrow band of solder up to and abutting against the straight edges of said coated body portion as a barrier, said metallic paint being substantially unaffected by the heat of the molten solder and serving to repel the solder from flowing thereover, whereby to effect substantial economies in the expenditure of solder and to provide a container of attractive appearance.

2. A sheet metal container having a soldered side seam, comprising a tubular body consisting of black iron having a portion of its exterior surface on opposite sides of the side seam and substantially equally spaced therefrom, coated with a heat resistant and solder repellent aluminum paint, said coated area defining on opposite sides of the seam straight edges running parallel with said seam and defining therebetween an area free of said coating to constitute an effective solderable side seam area of restricted minimum width, said uncoated area of the body being completely covered with a narrow band of solder up to and abutting against the straight edges of said coated body portion as a barrier, said aluminum paint being substantially unaffected by the heat of the molten solder and serving to repel the solder from flowing thereover, whereby to effect substantial economies in the expenditure of solder and to provide a container of attractive appearance.

3. A sheet metal container having a soldered side seam, comprising a tubular body having a portion of its exterior surface on opposite sides of the side seam and substantially equally spaced therefrom, coated with a heat resistant and solder repellent metallic paint, said coated area defining on opposite sides of the seam straight edges running parallel with said seam and defining therebetween an area free of said coating to constitute an effective solderable side seam area of restricted minimum width, said uncoated area of the body being completely covered with a narrow band of solder up to and abutting against the straight edges of said coated body portion as a barrier, a heat resistant and solder repellent coating of metallic paint on the interior of said body covering the entire interior body surface including the inner side seam area, said metallic paint coatings being substantially unaffected by the heat of the molten solder and serving to repel the solder from flowing thereover, and a lithographed coating superimposed on said metallic paint coating and terminating inwardly of the outer edges of the latter on opposite sides of said seam so as to be unaffected by the heat of the molten solder, whereby to effect substantial economies in the expenditure of solder and to provide a container of attractive appearance.

DELBERT E. WOBBE.